Feb. 7, 1967     D. L. BROWN ETAL     3,302,350
MOLDING CONSTRUCTION
Filed March 10, 1964     2 Sheets-Sheet 1
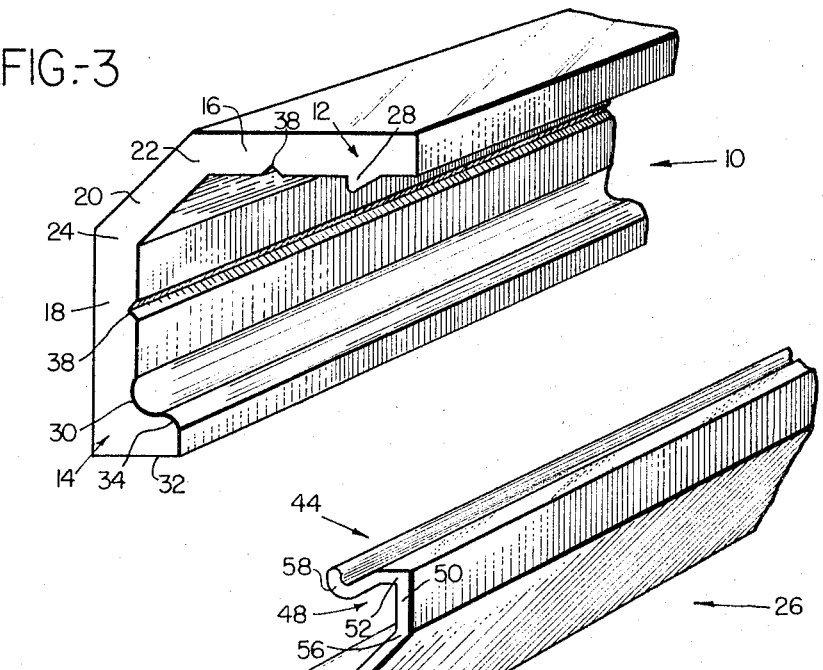
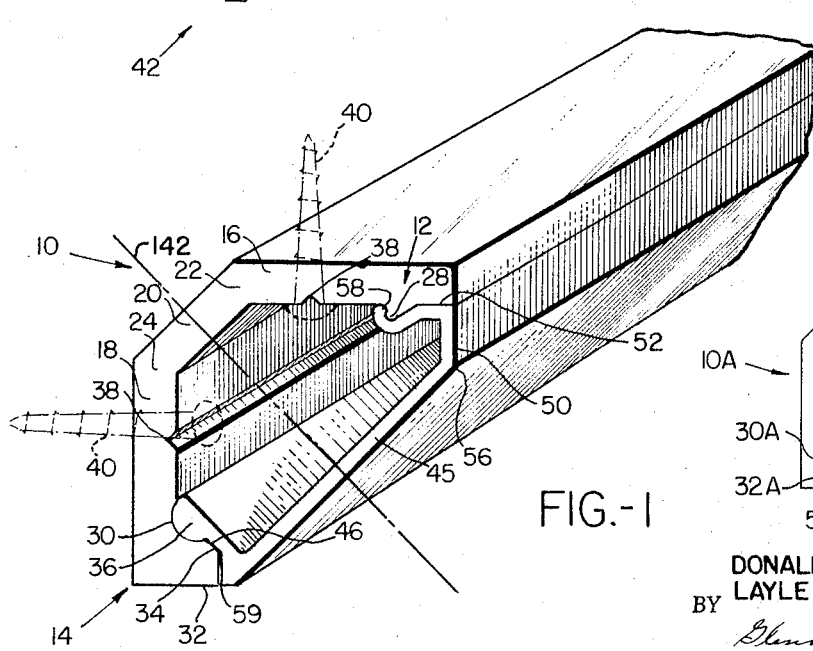
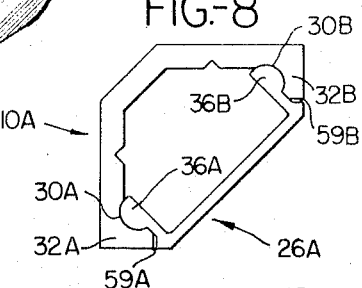
INVENTORS
DONALD LEE BROWN
LAYLE BRENT BARKER
BY
THEIR ATTORNEYS

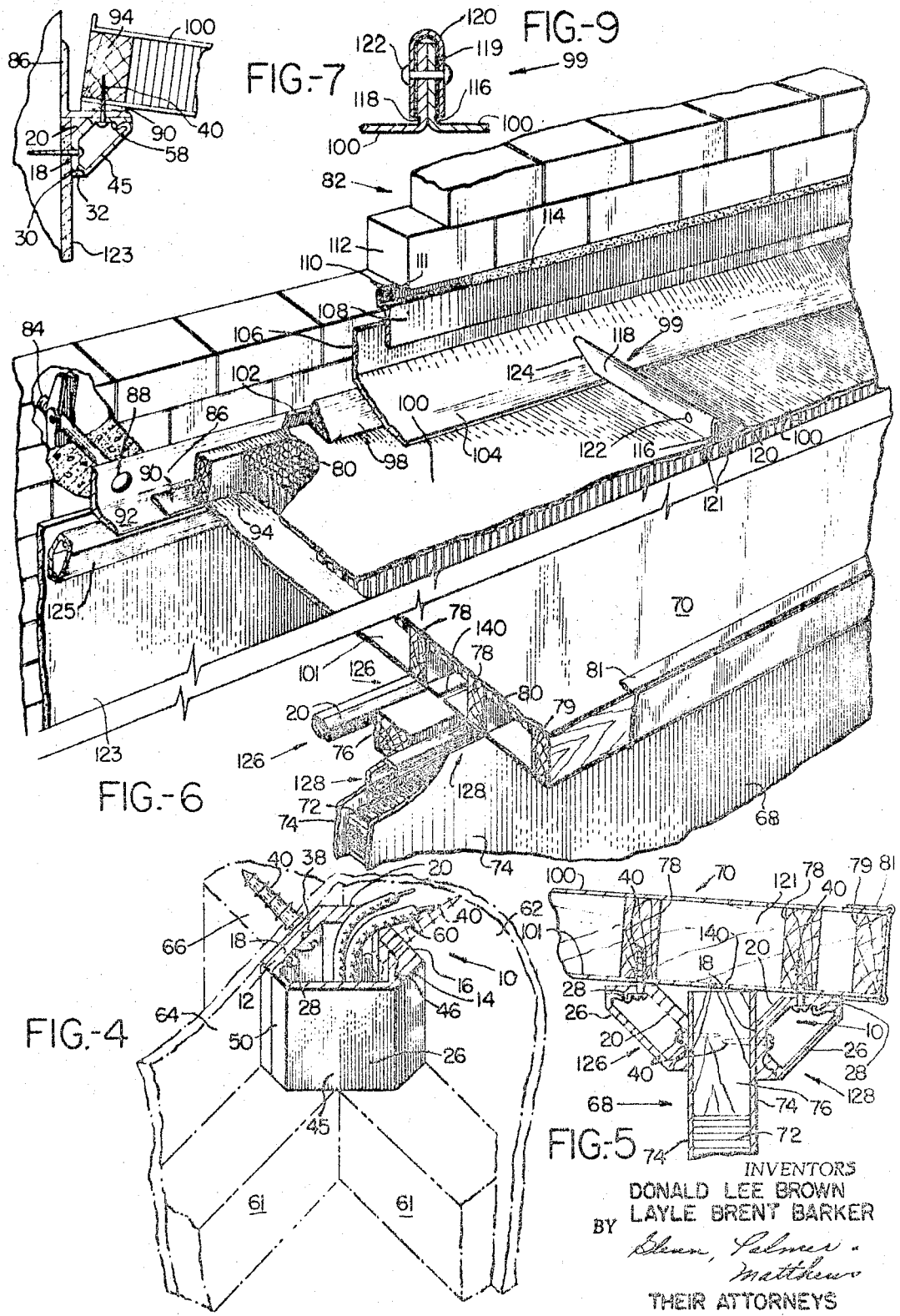

United States Patent Office 3,302,350
Patented Feb. 7, 1967

3,302,350
MOLDING CONSTRUCTION
Donald Lee Brown and Layle B. Barker, Henrico County,
Va., assignors to Reynolds Metals Company, Richmond,
Va., a corporation of Virginia
Filed Mar. 10, 1964, Ser. No. 350,742
5 Claims. (Cl. 52—287)

This invention relates to a molding construction.

The molding construction of this invention may be a hollow extruded molding construction which may include one or more extruded, relatively long, attaching members which may be initially secured at various corners of a building and the like. Typical corners are such as occur when two vertical, horizontal, or slanting, building partitions adjoin each other to form such corners. The building partitions may be side wall forming members, ceiling or roof forming members, floor forming members, and the like, for a structure such as a building.

Extruded cover members for the attaching members may be snapped on or secured to the extruded attaching members to form a hollow molding construction along said corners. The extruded cover members may also be relatively long.

If desired, electrical wiring and the like may be installed inside the hollow molding construction. For example, such wiring may be placed in the wall structure of the attaching member. Then the cover member may be secured to the attaching member to form the hollow molding construction with the electrical wiring in it. Alternatively, the attaching member and cover member may be attached and assembled and then the wiring may be installed within the assembled molding construction. Also, if the molding construction has been attached and assembled and then it is desired to install the wiring, the cover member may be removed, the wiring may be installed in the attaching member and then the cover member may be replaced.

If desired, the attaching members may have a generally diverging wall structure to fit into the corners, and the cover members may be generally flat. These members may have attaching means for attaching them to each other, such as at their edges.

Other features and advantages are apparent from this description, the appended claimed subject matter, and/or the accompanying drawings in which:

FIGURE 1 is a perspective view of an assembled molding construction according to this invention.

FIGURE 2 is a perspective view of the cover member of the molding construction.

FIGURE 3 is a perspective view of a corner attaching member of the molding construction.

FIGURE 4 is a perspective view of the molding construction attached at a vertical corner of adjoining building partitions, such as the side walls of a room and the like, and with electric conductors therein.

FIGURE 5 is a diagrammatic cross section showing the molding construction attached to a horizontal inside corner and a horizontal outside corner formed between adjoining building partitions, such as between a vertical outside wall and an adjoining almost horizontal roof or ceiling partition.

FIGURE 6 is a perspective view showing the molding construction applied to various corner constructions which may occur, for example, between a previously constructed outside wall and an added roof or ceiling construction and also between a new outside vertical wall partition and a new almost horizontal roof or ceiling partition.

FIGURE 7 is a vertical cross section showing the molding construction attached to the horizontal corner between the previously constructed outside wall and the newly added roof construction.

FIGURE 8 shows another embodiment of an assembled molding construction somewhat similar to that shown in FIGURE 1.

FIGURE 9 is an enlarged cross section of the roof joint shown in FIGURE 6.

A molding construction or combination, according to this invention, may be placed at various corners of adjoining building partitions of any character, such as corners formed between side wall partitions, roof or ceiling partitions, floor partitions and the like.

Such a molding construction or combination may include a relatively long corner attachment member 10. This attaching or attachment member 10 may be attached at corners of adjoining building partitions of any character.

The attaching member 10 may have an outwardly diverging wall structure, as shown in FIGURES 1 and 3. The outwardly diverging wall structure may have two wall edges 12 and 14. Such outwardly diverging wall structure may be formed from a continuously uniform extrusion of any suitable material, such as any suitable metal or plastic material, such as an aluminum alloy and the like, such as aluminum alloy 6063–T5. The extrusion may be in the form of two relatively flat diverging walls 16 and 18. These diverging walls 16 and 18 may be joined by a relatively flat, slanting, joining wall 20 which forms obtuse angles at 22 and 24 between the walls 16, 18 and 20.

The wall edges 12 and 14 may each have wall edge attaching means for attachment to a cover member 26. One of the wall attaching means at the wall edge 12 may be in the form of a hooking protrusion 28. The other of said wall edge attaching means at the other wall edge 14 may be in the form of a snap joint forming arc 30 which is formed adjacent to a flange 32 at the edge 14. The flange 32 also has a guiding rounded surface 34 to guide the protrusion 36 of the cover member 26 into the arc 30, as will be more fully described.

The wall structure of the attaching or attachment member 10 may be provided with one or more fastener locating continuous longitudinal grooves 38, for example, at each of the walls 16 and 18. These grooves 38 are for the purpose of guiding or locating fasteners 40 for attachment of the attaching member 10 to one or more partitions. These fasteners may be screw members or the like.

The construction of the fastening member 10 and its walls 16, 18 and 20 is such that the fastening member may be attached satisfactorily not only to a subtsantially 90° corner, but also the corners that vary slightly but perceptibly from 90°, as is indicated in FIGURES 5 and 7. The slanting wall 20 allows the attaching member 10 to adjust itself to such corners.

The relatively long cover member 26 may be formed from a continuously uniform extrusion with two cover edges 42 and 44. It also may be made from any suitable material, such as that described in connection with the attaching member 10.

The cover member 26 may be in the form of a relatively flat wall 45 with cover edge attaching means being carried by flanges 46 and 48 at the edges of flat wall 45, which flanges may be resilient, if desired. One of the flanges 48 may be in the form of two right angled walls 50 and 52 joined to each other at a substantially right angle with one wall 50 being joined at one edge 48 to the flat wall 45, with the formation of an obtuse angle 56.

The other right angled wall 52 may be provided with a hook structure 58 at its free edge. The hook structure 58 may engage the hooking protrusion 28 of the attaching member 10 when the cover 26 is to be assembled on the attaching member 10.

In attaching the molding construction to a corner, such as shown in FIGURE 4, the attaching member 10 may first be secured to one or both of the adjoining building partitions 62 and 64. This may be acomplished by drilling or otherwise forming holes in the walls 16 and 18, preferably along the grooves 38 through which the screws 40 are driven into the partitions 62 and 64. If desired, the screws 40 may be driven into the more substantial parts 66 of the partitions, which may be wooden parts, cement parts, and the like.

After the attaching member 10 has been secured in the desired corner or corners, the cover member 26 may be secured to the attaching member 10, with or without the previous insertion of one or more wires 60 in the attaching means 10. If used, the wires 60 may be preliminarily held in the attaching member 10 by any desired means, such as by adhesive tape or the like, attached at sufficient intervals to hold the wires in place until the cover 26 has been attached in place. Alternatively, the wire or wires 60 may be pulled through the assembled molding combination after the cover 26 has been attached to the member 10. Also, if the molding has been assembled and it is then desired to add wiring and the like, the cover member 26 may be removed by a screwdriver which can be wedged and twisted in slot 59. Then the wires 60 and the like may be added and then the cover member 26 may be replaced.

The wire or wires 60 may be brought to the molding construction through hollow baseboards 61.

One method of attaching the cover 26 to the attaching member 10 is to place the hook 58 of the cover 26 over the protrusion 28 of the attaching member 10, and then to snap the resilient flange 46 over the flange 32, the protrusion 36 riding over the curved or rounded guiding surface 34, and snapping into the snap joint forming arc 30.

Molding constructions of this invention may be used for horizontal corners, such as shown at 126 and 128 in FIGURES 5 and 6, in which an exterior wall or partition 68, which is also shown in FIGURE 6, adjoins the added nearly horizontal ceiling or roof panel construction 70 which is also shown in FIGURE 6.

Both of these partitions 68 and 70 may be of any desired construction. As illustrated, the partition or side wall panel 68 may be a honeycomb type of panel in which paper honeycomb members are encased in metal outer sheets 74. The edges of the panel 68 may be provided with wood strips 76. These wood strips 76 may be encased in and laminated or adhered to the metal sheets 74. The molding attaching member 10 may be secured to the inner or outer horizontal corners, which are illustrated in FIGURES 5 and 7, and the screws 40 may be inserted through openings formed in the attaching member 10. The screws may be driven into the wooden parts 76 of the vertical wall 68 and wooden parts 78 which have been provided in the roof paneling 70. The roof panel may also include honeycomb portions 80. Preferably the screws 40 are inserted into any part of the partitions that has sufficient strength to hold the screws and the attaching members 10, such as the wooden parts 78.

In FIGURES 5 and 7, the roof panel 70 is shown slightly slanted or varied from a true 90° angle, and the slant is perceptible. The slanting wall 20 of the attaching member 10 allows the attaching member 10 to be placed closer to the corner, particularly on the left hand side of the wall 68, as shown in FIGURE 5.

The molding structure herein disclosed is useful in a construction where an additional room is to be erected adjacent a previously erected wall 82. For example, a shed roof panel 70 may extend from the previously constructed wall 82 to the new outer wall 68, as shown in FIGURES 5, 6 and 7.

The roof panels 70 may be supported on the previously erected wall 82 in any desired manner. For example, a supporting metal angle member 86, such as of aluminum alloy may be secured to the wall 82 by means of toggle bolts 84 which pass through the vertical wing of the angle member 86. The head 88 of the toggle bolt 84 is shown at 88 in FIGURE 6. Suitable holes are drilled in the previous wall 82 for the reception of the toggle bolts 84.

If desired, a wooden shim 90 may be placed over the horizontal wing 92 of the angle 86 and underneath the edge of the roof panels 70.

The inner edge of the roof panel may be provided with a wooden edge member 94, into which the screws, not shown, may extend from the horizontal wing 92 of the angle member 86. A wood cant or triangular member 98 may be adhesively secured to the upper metal sheet 100 of the roof panel, and the sheet 100 may be bent upwardly at a flange 102 along the edge of the triangular wood member 98. A flashing member 104 may be adhesively secured to the slanting side of the cant member 98, and the other edge 106 of flashing member 104 may be placed close to the outer surface of the wall 82. Another flashing member 108 may have its upper edge inserted in a groove formed in the seam between the building blocks 112 of the wall 82, with screws 110 holding the upper edge 111 in place. The screws may be held in the mortar between the blocks 112 of the structure. Suitable caulking compound may be placed in the various joints, such as 114.

The upper sheet members 100 of the adjacent roof panels may be formed into a water tight joint 99, as shown in FIGURES 6 and 9. The adjoining sheet members 100 may be bent upwardly to form the flanges 116 and 118. Tape sealant 119 may be placed over flanges 116 and 118. Then a metal cap 120 may be placed over the tape sealant 119. Rivets 122 may then be passed through the joint to hold the joint together or the assembly may be button punched. Wood edge members 121 of the roof panels may be laminated or adhered to the panel sheets 100 and 101. These roof panel joints 99 may pass through notches 124 in the flashing member 104.

A molding construction 125 according to this invention, as shown in FIGURES 6 and 7, may be placed in the horizontal corner which is produced between the adjoining previously erected wall 82 and the new roof partition 70. The wall 82 may have plaster 123 applied to it below the angle member wing 92. The attaching member 10 may then be secured by screws 40 which may be inserted into the previous wall construction 82 and into the wood edge member 94 as shown in FIGURE 7.

The molding constructions 126 and 128 along the new wall 68 are shown in FIGURES 5 and 6.

It is thus to be seen that a new, unobvious and useful corner extruded molding construction has been provided. The attaching members 10 may first be secured to the building partition or partitions where they adjoin at various corners. The covers 26 may be snapped on or secured to the edges of the attaching members 10. Electric wiring 60 and the like may be installed in the molding construction before or after the covers 26 are secured to the attaching members 10.

The lower sheet 101 of the roof panel construction 70 may be provided with a thermal break at 140, FIGURES 5 and 6. This may be accomplished by a saw cut at 140 to break the continuity of heat conduction along the lower sheet 101.

The outer wood frame member 79 may be laminated or adhered to the upper sheet 100 and the lower sheet 101 leaving the wood member temporarily uncovered, if desired. Then a metal facia member 81 is placed over the outer edge of the roof. This facia member 81 may be of conventional design and may have its flanges secured by screws or other fasteners and the flanges may be sealed to the sheets 100 and 101.

The member 20 and the wall edges or flanges 14 and 16 of FIGURES 1 and 3 are made extra thick to provide a very strong structural tie wherever applied. For example, a strong structural tie is produced by these thick members between the roof panel construction 70 and the outer vertical wall 68 to resist the uplift caused by wind. The resisting forces are transmitted through the wood members 78 into the thickened members 14, 16 and 20 by the screws 40 and into the wood member 76 of the wall panel 68. The same strong resisting force is produced by these thick members 14, 16 and 20 wherever they are applied.

If desired, the structures shown in FIGURES 1, 2 and 3 may be symmetrical about the plane 142 of FIGURE 3 to produce a construction as shown in FIGURE 8 in reduced scale. The member 10A of FIGURE 8 has symmetrical curves 30A and 30B. The member 26A of FIGURE 8 also has symmetrical beads 36A and 36B which fit and have a holding action in the curves 30A and 30B. Otherwise the members 10A and 26A may be substantially the same in general construction and function. The cover member 26A may be forced into engagement with member 10A, as is obvious. The members will hold together unless pried apart by a screwdriver or the like at one or both seams 59A corresponding to seam 59 of FIGURE 3.

An advantage of the construction shown in FIGURE 8 is that both members 10A and 26A may be assembled on the job without confusion and without regard to which flange 32A or 32B or which bead 36A or 36B is made to engage the other, since they are symmetrical. The members 10A and 26A may be assembled with either end in any given direction. Hence assembly on the job has been simplified.

It is, therefore, to be seen that a new, unobvious and useful molding construction and method of installing the same has been provided.

While the form of the invention now preferred has been disclosed as required by statute, other forms may be used, all coming within the scope of the claimed subject matter which follows.

What is claimed is:

1. In combination: a pair of right angled building partitions defining a longitudinal corner; a relatively long corner attaching member attached at said corner of said adjoining building partitions throughout substantially the entire length of said corner, said attaching member having an outwardly diverging wall structure to form said attaching member with two wall edges, each wall edge being flat and being disposed flush against its respective partition, each wall edge having a flat free end disposed at right angles to its respective partition; a relatively long flat cover member having two cover edges each with resilient flanges extending inwardly therefrom; and attaching means at said wall edges and said resilient cover flanges to attach one each of said wall edges to one each of said cover flanges throughout substantially the entire length of said corner, said flanges of said cover member being received between said wall edges of said attaching member so that said cover member fills all external voids between said end edges of said attaching member, one of said flanges of said cover member being in the form of two right angled joined walls with one wall joined to one edge of said flat wall at an obtuse angle relative thereto and the other right angled wall having a hook structure at its edge for attaching to one of said wall edges of said attaching member, the other of said flanges of said cover member being substantially perpendicular to said flat wall in inwardly offset relation to the respective edge of said flat wall and having an arc shaped snap joint forming protrusion for attaching to the other wall edge of said attaching member.

2. A combination according to claim 1 with said one wall edge having a continuous hooking protrusion and with the respective cover flange having said hook engaging said protrusion.

3. A combination according to claim 1 with said other wall edge having a continuous snap joint forming groove receiving said snap joint forming protrusion.

4. A combination according to claim 1 with said one wall edge having a continuous hooking protrusion and with the respective cover flange having said hook engaging said protrusion, with said other wall edge having a continuous snap joint forming groove, said snap joint forming protrusion.

5. A relatively long cover member with two cover edges with cover edge attaching means for attachment to a relatively long corner attachment member, said cover member being in the form of a relatively flat wall with said cover edge attaching means being carried by a resilient flange at each edge of said flat wall, one of said flanges being in the form of two right angled joined walls with one wall joined to one edge of said flat wall at an obtuse angle and the other right angled wall having a hook structure at its edge, the other of said flanges being substantially perpendicular to said flat wall in inwardly offset relation to the respective edge of said flat wall and having an arc shaped snap joint forming protrusion.

References Cited by the Examiner

UNITED STATES PATENTS

| | | | |
|---|---|---|---|
| 1,223,288 | 4/1917 | Otte | 52—717 |
| 1,426,277 | 8/1922 | Conant | 52—717 |
| 1,919,300 | 7/1933 | Lewis | 52—288 |
| 2,132,400 | 10/1938 | Curren | 52—716 |
| 2,230,348 | 2/1941 | Cox | 52—495 |
| 2,253,489 | 8/1941 | Smith | 52—287 |
| 2,496,910 | 2/1950 | Fridolph | 52—716 |
| 2,641,029 | 6/1953 | Trimmer | 52—288 |
| 2,924,856 | 2/1960 | Price | 52—484 |
| 2,981,988 | 5/1961 | Schwettzer | 52—288 |
| 3,034,824 | 5/1962 | Schubach | 52—288 |
| 3,170,268 | 2/1965 | Balzer et al. | 52—466 |

FOREIGN PATENTS 905,798  9/1962  Great Britain.

OTHER REFERENCES

Herron-Zimmers catalog, pages 1 and 4 (1939).

FRANK L. ABBOTT, *Primary Examiner.*

R. A. STENZEL, *Assistant Examiner.*